(12) United States Patent
Willett et al.

(10) Patent No.: US 8,843,370 B2
(45) Date of Patent: Sep. 23, 2014

(54) JOINT DISCRIMINATIVE TRAINING OF MULTIPLE SPEECH RECOGNIZERS

(75) Inventors: Daniel Willett, Walluf (DE); Chuang He, Westford, MA (US)

(73) Assignee: Nuance Communications, Inc., Burlington, MA (US)

( * ) Notice: Subject to any disclaimer, the term of this patent is extended or adjusted under 35 U.S.C. 154(b) by 1432 days.

(21) Appl. No.: 11/945,048

(22) Filed: Nov. 26, 2007

(65) Prior Publication Data

US 2009/0138265 A1    May 28, 2009

(51) Int. Cl.
*G10L 15/06* (2013.01)
*G10L 15/14* (2006.01)
*G10L 15/30* (2013.01)

(52) U.S. Cl.
CPC .............. *G10L 15/30* (2013.01); *G10L 15/063* (2013.01)
USPC ................... 704/243; 704/255; 704/256.2

(58) Field of Classification Search
CPC ....... G10L 15/06; G10L 15/063; G10L 15/14; G10L 15/32
USPC ............... 704/236, 243, 244, 255, 240, 256.2
See application file for complete search history.

(56) References Cited

U.S. PATENT DOCUMENTS

| | | | |
|---|---|---|---|
| 5,606,644 A * | 2/1997 | Chou et al. | 704/243 |
| 5,710,864 A * | 1/1998 | Juang et al. | 704/238 |
| 5,754,681 A * | 5/1998 | Watanabe et al. | 382/159 |
| 5,805,771 A * | 9/1998 | Muthusamy et al. | 704/232 |
| 6,112,175 A * | 8/2000 | Chengalvarayan | 704/256.5 |
| 6,125,345 A * | 9/2000 | Modi et al. | 704/240 |
| 6,456,969 B1 * | 9/2002 | Beyerlein | 704/234 |
| 6,490,555 B1 * | 12/2002 | Yegnanarayanan et al. | 704/231 |
| 7,305,132 B2 * | 12/2007 | Singh et al. | 382/224 |
| 7,617,103 B2 * | 11/2009 | He et al. | 704/256 |
| 7,885,812 B2 * | 2/2011 | Acero et al. | 704/244 |
| 2003/0115053 A1 * | 6/2003 | Eide et al. | 704/231 |
| 2004/0138885 A1 * | 7/2004 | Lin | 704/240 |
| 2004/0153319 A1 * | 8/2004 | Yacoub | 704/240 |
| 2004/0267530 A1 * | 12/2004 | He et al. | 704/256 |
| 2005/0065790 A1 * | 3/2005 | Yacoub | 704/231 |
| 2008/0091424 A1 * | 4/2008 | He et al. | 704/240 |
| 2008/0114596 A1 * | 5/2008 | Acero et al. | 704/244 |
| 2009/0018833 A1 * | 1/2009 | Kozat et al. | 704/257 |
| 2009/0055182 A1 * | 2/2009 | He et al. | 704/256.2 |
| 2009/0112586 A1 * | 4/2009 | Williams | 704/239 |
| 2012/0259627 A1 * | 10/2012 | Willett et al. | 704/231 |
| 2012/0259632 A1 * | 10/2012 | Willett | 704/234 |

OTHER PUBLICATIONS

Droppo et al., "Joint Discriminative Front End and Back End Training for Improved Speech Recognition Accuracy", Proceedings ICASSP 2006, May 2006, pp. I-281 to I-284.*

Saraclar et al., "Joint Discriminative Language Modeling and Utterance Classification", IEEE International Conference on Acoustics, Speech, and Signal Processing, 2005, ICASSP '05, pp. 561 to 564.*

(Continued)

*Primary Examiner* — Martin Lerner

(74) *Attorney, Agent, or Firm* — Sunstein Kann Murphy & Timbers LLP

(57) ABSTRACT

Adjusting model parameters is described for a speech recognition system that combines recognition outputs from multiple speech recognition processes. Discriminative adjustments are made to model parameters of at least one acoustic model based on a joint discriminative criterion over multiple complementary acoustic models to lower recognition word error rate in the system.

12 Claims, 2 Drawing Sheets

(56) References Cited

OTHER PUBLICATIONS

Droppo et al., "Joint Discriminative Front End and Back End Training for Improved Speech Recognition Accuracy", 2006 IEEE International Conference on Acoustics, Speech and Signal Processing, 2006 (ICASSP 2006), May 14-19, 2006, pp. I-281 to I-284.*

Chen, Jung-Kuei, et al, "An N-Best Candidates-Based Discriminative Training for Speech Recognition Applications", *IEEE Transactions on Speech Audio Processing, IEEE, Inc.*, vol. 2, No. 1, New York, US, Jan. 1994, pp. 206-216.

Huang, Eng-Fong, et al, "A Probabilistic Acoustic Map Based Discriminative HMM Training", *International Conference on Acoustics, Speech and Signal Processing* Apr. 3-6, 1990, pp. 693-696.

Korkmazskiy, F, et al, "Discriminative Training of the Pronunciation Networks", *Workshop on Automatic speech Recognition and Understanding Proceedings*, Dec. 14, 1997, pp. 223-229.

Li, Qi, et al, "A New Algorithm for Fast Discriminative Training", *Proceedings of International Conference on Acoustics, Speech and Signal Processing*, May 5, 2002, pp. 1-97.

Woodland, P.C., et al, "Large Scale Discriminative Training for Speech Recognition", *Computer Speech and Language*, Jan. 2002.

Fiscus, "A Post-Processing System To Yield Reduced Word Error Rates: Recognizer Output Voting Error Reduction (ROVER)," Proc. IEEE ASRU Workshop, pp. 347-352, Santa Barbara, 1997.

Evermann et al., "Posterior Probability Decoding, Confidence Estimation and System Combination," Proc. of the NIST Speech Transcription Workshop, 2000.

Mangu et al., "Finding Consensus In Speech Recognition: Word Error Minimization And Other Applications Of Confusion Networks", Computer Speech and Language 14(4), 373-400, Oct. 2000.

Breslin et al., "Generating Complementary Systems for Speech Recognition," In: 9th International Conference on Spoken Language Processing (ICSLP) (InterSpeech 2006), Sep. 17-21, 2006, Pittsburgh, PA, US.

* cited by examiner

JOINT DISCRIMINATIVE TRAINING OF MULTIPLE SPEECH RECOGNIZERS

FIELD OF THE INVENTION

The present invention relates to automatic speech recognition, and more specifically to training and adapting the acoustic models which are used.

BACKGROUND ART

The goal of automatic speech recognition (ASR) systems is to determine the lexical identity of spoken utterances. The recognition process, also referred to as classification, begins with the conversion of an input speech signal into a stream of spectral vectors or frames that describe the important characteristics of the signal at specified times. Classification is attempted by first creating reference acoustic models that describe some aspect of the behavior of spectral frames corresponding to different words.

A wide variety of acoustic models have been developed, which typically describe the temporal characteristics of spectra typical to particular words or sub-word segments. The sequence of spectra arising from an input utterance is compared to such acoustic models, and the success with which different acoustic models predict the behavior of the input frames determines the putative identity of the utterance.

Many current systems use some variant of statistical acoustic model such as the hidden Markov model (HMM). Such models consist of sequences of states connected by arcs, and a probability density function (pdf) associated with each state which describes the likelihood of observing any given spectral vector at that state. A separate set of probabilities determines transitions between states. The probability densities which describe the observed spectra associated with the states of the HMM are typically in the form of a continuous pdf which are parametric functions that specify the probability of any arbitrary input spectral vector, given a state. One common class of functions used for this purpose is a mixture of Gaussians where arbitrary pdfs are modeled by a weighted sum of normal distributions. One drawback of using continuous pdfs is that the designer must make explicit assumptions about the nature of the pdf being modeled—something which can be quite difficult since the true distribution form for the speech signal is not known.

The total number of pdfs in a recognition system depends on the number of distinct HMM states, which in turn is determined by type of models used—e.g., phonetic or word models. In many systems the states from different models can be pooled—i.e., the states from different models can share pdfs from a common set or pool. For example, some states from two different models that represent a given phone in different phonetic contexts (i.e., an allophone) may have similar pdfs. In some systems these pdfs will be combined into one, to be shared by both states. This may be done to save memory and in some instances to overcome a problem known as undertraining.

The acoustic model pdfs are most commonly trained as well as adapted to specific conditions using the maximum likelihood method, which adjusts the acoustic model parameters so that the likelihood of observing the training or adaptation data given the model is maximized. But this approach does not necessarily produce optimal recognition performance. Another training approach known as discriminative training adjusts the acoustic model parameters so as to minimize the number of recognition errors rather than fit the distributions to the training data.

FIG. 1 shows a feature vector 10 representative of an input speech frame in a multidimensional vector space, a "correct" state $S_C$ 11 from the acoustic model that corresponds to the input speech, and an "incorrect" state $S_I$ 12 from an acoustic model that does not correspond to the input speech. As shown in FIG. 1, the vector space distance from the feature vector 10 to the best branch 13 (the closest mixture component) of correct state $S_C$ 11, is very nearly the same as the vector space distance from the feature vector 10 to the best branch 14 of the incorrect state $S_I$ 12. In this situation, there is very little basis at the state level for distinguishing the correct state $S_C$ 11 from the incorrect state $S_I$ 12. Discriminative training attempts to adjust the best branch 13 of correct state $S_C$ 11 a little closer to the vector space location of feature vector 10, and adjust the best branch 14 of the incorrect state $S_I$ 12 a little farther from the vector space location of feature vector 10. Thus, a future feature vector near the vector space of feature vector 10 will be more likely to be identified with correct state $S_C$ 11 than with incorrect state $S_I$ 12. Of course discriminative training may adjust the vector space of the correct state with respect to multiple incorrect states. Similarly, rather than adjusting the best branches of the states, a set of mixture components within each state may be adjusted.

Discriminative training gives rise to its own problems such as how to appropriately smooth the discriminatively-trained pdfs, and how to adapt these systems to system changes (such as a new user) with a relatively small amount of training data. The foregoing is discussed at more length in U.S. Pat. No. 6,490,555, which is hereby incorporated by reference.

In recent years, literature in the field of speech recognition has described systems which determine a recognition output by combining the output of multiple speech recognition processes for improved overall performance. For convenience, such discussions often are framed in terms of "multiple recognizers." But such combination approaches need not be limited to the specific situation of entirely different recognition engines and software code. A given speech input may be processed in various different ways which can be thought of as operating in parallel. That is, multiple recognition processes may be implemented on one or more physical machines. The software code used to implement the recognition processes may be entirely different, or part of a single integrated system. Similarly, the acoustic models used may be different in some applications, but in others, multiple recognition processes may share some or all of the acoustic models. Rather, both in the literature and within the present discussion, references to "multiple recognizers" should be understood as referring more broadly to multiple complementary speech recognition processes which operate on a given speech input and produce different competing recognition outputs which are then combined to determine the final recognition output. The output of each of the recognition processes can be in a variety of well-known forms such as a single or multiple sequences of lexical units (words) with the units labeled with confidence estimates or not, or as word graphs or confusion networks, etc. FIG. 2 illustrates the general architecture of a speech recognition system based on multiple recognition processes.

Two popular such approaches are "Recognizer Output Voting for Error Reduction" (ROVER) (for example, described in J. G. Fiscus, *A Post-Processing System To Yield Reduced Word Error Rates. Recognizer Output Voting Error Reduction*, Proc. ASRU, 1997, hereby incorporated by reference) and "Confusion Network Combination" (CNC) (for example, described in G. Evermann, P. Woodland, *Posterior Probability Decoding, Confidence Estimation And System Combination*, NIST Workshop, 2000; and L. Mangu, E. Brill, A Stolcke, *Finding Consensus In Speech Recognition: Word Error Minimization And Other Applications Of Confusion Networks*, CSL, 2000, hereby incorporated by reference).

The success of these methods in terms of improved word error rate (WER) of the combined model pool over each individual performance figure depends on two aspects. On the one hand, each of the combined recognition systems needs to be sufficiently good, and on the other hand, the systems need to make different errors, i.e. they have to be complementary. These two objectives are usually achieved by rather random system variations that ensure only slight performance (WER) differences among systems while they are known to yield at least some complementary system performance. Such variations comprise front-ends, model topology, differently selected or weighted training data and others. Alternatively, systems are combined via ROVER or CNC that have been established by different research groups or model training and decoding software and because of some differences in model and recognizer architecture yield different but similarly good outputs.

A joint training objective for multiple recognition systems for improved performance in combination is described in C. Breslin, M. J. F. Gales, *Generating Complementary Systems for Speech Recognition*, ICSLP 2006; hereby incorporated by reference. Their approach, motivated by a Minimum Bayes Risk formulation, yields a training data weighting for a second system based on (inverse) posterior probabilities estimated on the reference system. This results in a stronger influence in the parameter estimation of the second system of such utterances that are only poorly modeled by the reference system. Their approach is applied in a Maximum Likelihood framework, but in discriminative training, utterances and words are weighted differently according to posterior probabilities. Breslin and Gales do not indicate how to integrate their approach in a discriminative training framework.

SUMMARY OF THE INVENTION

Embodiments of the present invention adjust acoustic model parameters for a speech recognition system that combines recognition outputs from multiple speech recognition processes. Adjustments are made to model parameters of at least one acoustic model based on a joint discriminative criterion over multiple complementary acoustic models to lower recognition word error rate in the system. As non-limiting specific examples, adjustments to the model parameters according to the joint discriminative criterion may be performed using a Gradient Descent algorithm or Extended Baum-Welch algorithm.

In further specific embodiments, the complementary acoustic models may include the at least one acoustic model. The speech recognition system may combine recognition outputs based on a variety of specific approaches, including without limitation, a Confusion Network Combination (CNC) or Recognizer Output Voting for Error Reduction (ROVER) approach. The joint criterion may be based on specific discriminative parameter estimation objectives, such as, without limitation, Minimum Classification Error (MCE) or Maximum Mutual Information Estimation (MMIE) training. In some embodiments, the lower recognition word error rate may reach at least a 5% word error rate reduction. The discriminative adjustments may be made indirectly by adaptation of the model parameters such as by one or more linear and/or non-linear transformations.

DETAILED DESCRIPTION OF SPECIFIC EMBODIMENTS

Figure 1:
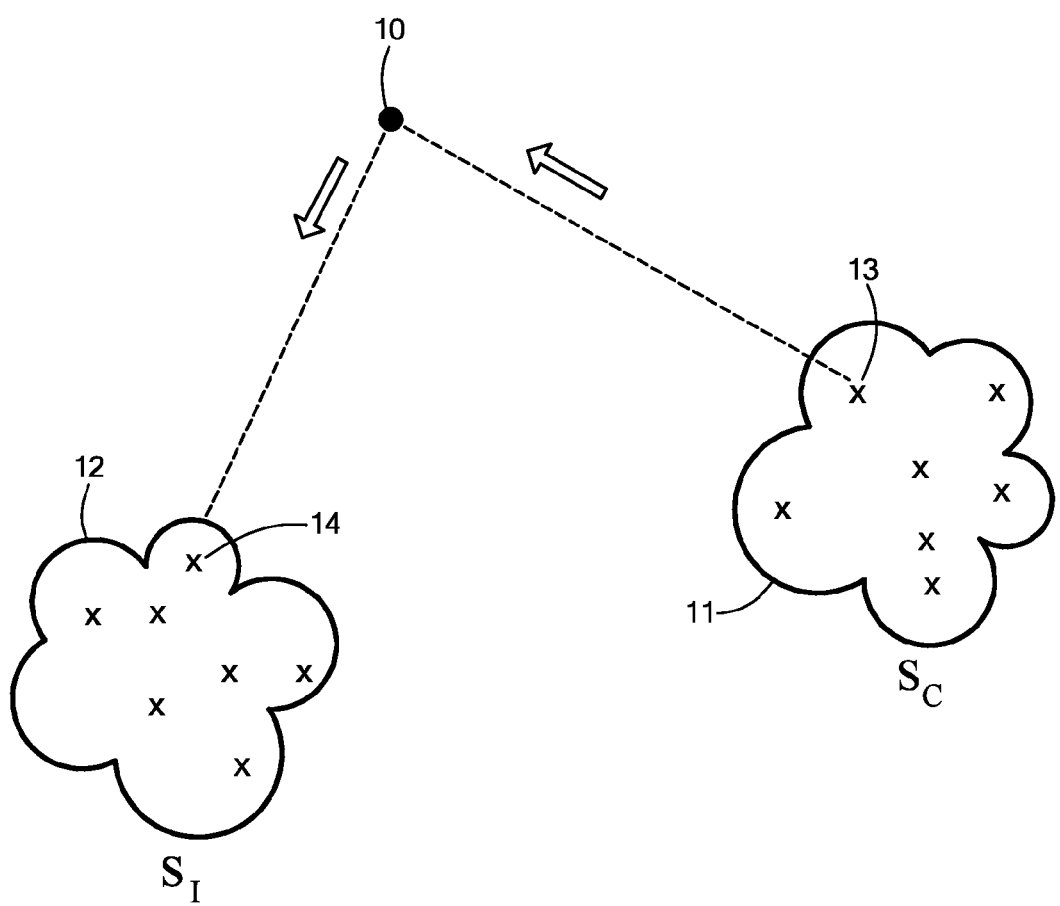
FIG. 1 illustrates the concept of discriminative adjustment of acoustic model parameters.
Figure 2:
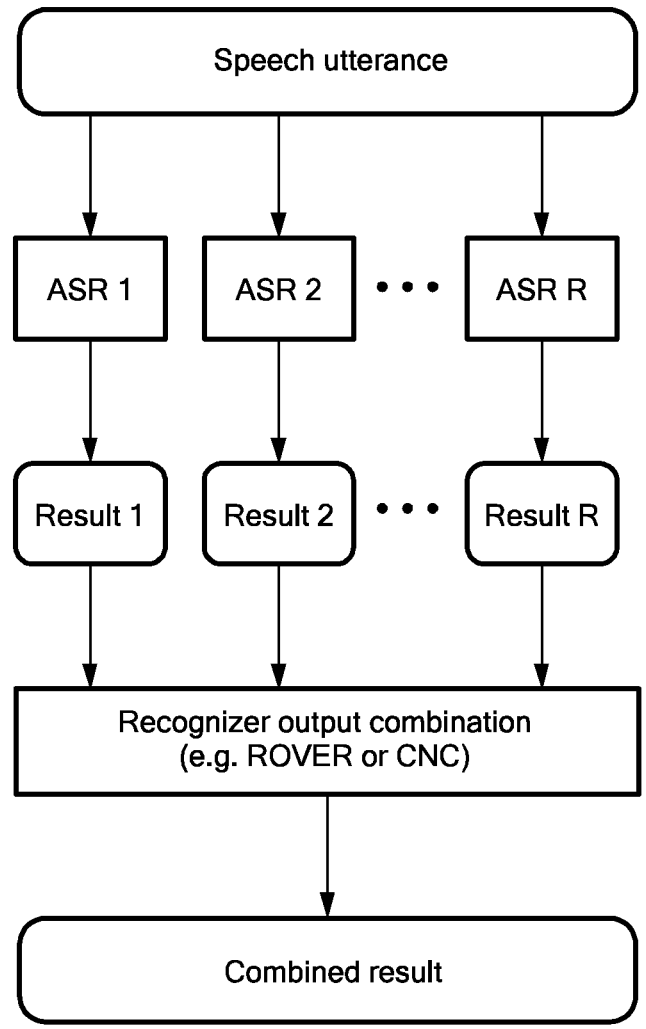
FIG. 2 illustrates the concept of output combination for multiple recognition processes.

Various embodiments of the present invention are directed to techniques for the direct integration of the target of joint system performance over systems having multiple independent speech recognition processes combined by approaches such as ROVER or CNC into the discriminative training objective of model parameter estimation.

Discriminative objectives usually target the optimization of a criterion in which the likelihood of the correct transcription is set into relation of the most likely incorrect recognition alternatives. The performance of a given acoustic model in combination with other reference acoustic models (e.g., by ROVER or CNC) can be directly targeted by augmenting the criterion with the score accumulated over those reference models.

For example, the criterion of Minimum Classification Error (MCE) training (a common discriminative training objective) can be formulated as $$\lambda_{MCE} = \operatorname*{argmax}_{\lambda} \sum_{u \in U} f\left(\log(P(W_u)p_\lambda(X_u \mid W_u)) - \log\left(\sum_{some W \neq W_u} P(W)p_\lambda(X_u \mid W))\right)\right) \quad (1)$$

where U represents the set of training utterances, $W_u$ represents the uttered word sequence, $X_u$ represents the acoustic observation, and "some $W \neq W_u$" refers to one or multiple incorrect recognition alternatives. Usually only the most likely incorrect utterance or utterances are considered. The term within $f(\ )$ is usually referred to as the misclassification measure, where the loss function $f(\ )$ itself is typically assumed to be sigmoidal:

$$f(z) = -\frac{1}{1 - e^{az}} \quad (2)$$

This objective clearly weights the likelihood of a correct transcription against possible incorrect recognition alternatives. Integrating the scores (observation likelihoods) of reference system(s) the misclassification measure can be reformulated as:

$$\left(\log\left(P(W_u)\sum_{r=1}^{R}\chi_r p_{\lambda_r}(X_u \mid W_u)\right) - \log\left(\sum_{some W} P(W)\sum_{r=1}^{R}\chi_r p_{\lambda_r}(X_u \mid W)\right)\right) \quad (3)$$

with r=1 . . . R being the set of model sets that are to be estimated, and $\chi_r$ and $p_{\lambda_r}$ being scaling factors that normalize the likelihood ranges and which can compensate for different average overall observation likelihoods between the system. The objective for training the parameters of the R systems then becomes:

$$\lambda_{multiModel\ MCE} = \underset{\lambda}{\mathrm{argmax}} \sum_{u \in U} f\left( \log\left( P(W_u) \sum_{r=1}^{R} \chi_r p_{\lambda_r}(X_u | W_u) \right) - \log\left( \sum_{someW \neq W_u} \left( P(W) \sum_{r=1}^{R} \chi_r p_{\lambda_r}(X_u | W) \right) \right) \right) \quad (4)$$

Maximizing this criterion yields parameter estimates that improve a trained model where the sum over scaled likelihoods over all models of the correct transcription is particularly weak against the overall models of incorrect recognition alternatives. Specific approaches for calculating the parameter estimates can be implemented in a variety of ways such as by a Gradient Descent algorithm or Extended Baum-Welch algorithm.

For the also common Maximum Mutual Information Estimation (MMIE) criterion:

$$\lambda_{MMIE} = \underset{\lambda}{\mathrm{argmax}} \prod_{u \in U} \frac{P(W_u) p_\lambda(X_u | W_u)}{\sum_{W} P(W) p_\lambda(X_u | W)} = \underset{\lambda}{\mathrm{argmax}} \sum_{u \in U} \left( \log(P(W_u) p_\lambda(X_u | W_u)) - \log\left( \sum_{allW} P(W) p_\lambda(X_u | W) \right) \right) \quad (5)$$

Incorporating the scaled and summed up score over multiple models is similarly straight forward:

$$\lambda_{multiModel\ MMIE} = \underset{\lambda}{\mathrm{argmax}} \sum_{u \in U} \left( \log\left( P(W_u) \sum_{r=1}^{R} \chi_r p_{\lambda_r}(X_u | W_u) \right) - \log\left( \sum_{allW} \left( P(W) \sum_{r=1}^{R} \chi_r p_{\lambda_r}(X_u | W) \right) \right) \right) \quad (6)$$

Why incorporation of the summed up scaled likelihoods in the criterion leads to improved performance of the involved models when combined by ROVER and CNC can be explained as follows. In ROVER and CNC, multiple models are combined by initially turning word likelihoods into word posterior probabilities using division through overall lattice likelihoods. Then, parallel word posterior probabilities are averaged over the combined systems. This process resembles summing up scaled likelihoods over the combined systems (as well as dividing them through the number of combined systems, which can be neglected since only relative differences matter). Therefore, the word posteriors probabilities over the multiple models combined via ROVER or CNC can be regarded as summed up posteriors per system. These posterior probabilities themselves are summed up likelihoods over arcs of similar start and end times divided by the overall lattice likelihood. The tunable scaling factors in the above criteria can be tuned to match the model weighting factors in CNC or ROVER as well as to compensate for different likelihood ranges over the multiple models and the average lattice likelihoods over the various systems.

From the foregoing theoretical considerations, one set of preliminary experiments in parameter estimation were performed according to the multi-model MCE criterion. This set of experiments yielded improvements of up to and exceeding a 5% word error rate reduction (WERR) in CNC of two accordingly trained systems as compared to the performance achieved with CNC over only independently discriminatively trained recognition systems.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of adjusting model parameters in a speech recognition system comprising:
   in a speech recognition system executed by computer system that combines recognition outputs from a plurality of parallel speech recognition processes that operate on a given speech input word sequence and produce different competing recognition outputs which are then combined to determine a final recognition output;
   wherein the speech recognition processes are complementary so as to produce different recognition errors on a given same speech input;
   performing a discriminative adjustment process including:
   i. selecting at least one acoustic model of the system, and
   ii. adjusting a plurality of model parameters of the selected acoustic model based on a joint discriminative criterion over a plurality of complementary acoustic models to lower combined recognition WER in the system over only independently discriminatively trained recognition systems.

2. A method according to claim 1, wherein the complementary acoustic models include the at least one acoustic model.

3. A method according to claim 1, wherein the speech recognition system combines recognition outputs based on a Confusion Network Combination (CNC) approach.

4. A method according to claim 1, wherein the speech recognition system combines recognition outputs based on a Recognizer Output Voting for Error Reduction (ROVER) approach.

5. A method according to claim 1, wherein the joint criterion is based on Minimum Classification Error (MCE) training.

6. A method according to claim 1, wherein the joint criterion is based on Maximum Mutual Information Estimation (MMIE) training.

7. A method according to claim 1, wherein adjusting a plurality of model parameters includes using a Gradient Descent algorithm.

8. A method according to claim 1, wherein adjusting a plurality of model parameters includes using an Extended Baum-Welch algorithm.

9. A method according to claim 1, wherein the lower recognition word error rate reaches at least a 5% word error rate reduction.

10. A method according to claim 1, wherein discriminative adjusting a plurality of model parameters includes performing parameter adaptation using at least one linear transformation.

11. A method according to claim 1, wherein discriminative adjusting a plurality of model parameters includes performing parameter adaptation using at least one non-linear transformation.

12. A speech recognition system containing acoustic models having model parameters adjusted by the method according to any of claims 1-11.

\* \* \* \* \*